United States Patent
von Gynz-Rekowski et al.

(10) Patent No.: US 10,017,992 B2
(45) Date of Patent: Jul. 10, 2018

(54) RADIAL BALL BEARING AND METHOD

(71) Applicant: ASHMIN HOLDING LLC, Conroe, TX (US)

(72) Inventors: Gunther HH von Gynz-Rekowski, Montgomery, TX (US); William C. Herben, Magnolia, TX (US)

(73) Assignee: Ashmin Holding LLC, Conroe, TX (US)

( * ) Notice: Subject to any disclaimer, the term of this patent is extended or adjusted under 35 U.S.C. 154(b) by 0 days.

(21) Appl. No.: 15/344,201

(22) Filed: Nov. 4, 2016

(65) Prior Publication Data

US 2018/0128051 A1    May 10, 2018

(51) Int. Cl.
| | |
|---|---|
| F16C 19/08 | (2006.01) |
| F16C 33/16 | (2006.01) |
| E21B 4/02 | (2006.01) |
| F16C 33/58 | (2006.01) |
| E21B 4/00 | (2006.01) |
| F16C 19/54 | (2006.01) |
| F16C 33/60 | (2006.01) |

(52) U.S. Cl.
CPC .............. *E21B 4/003* (2013.01); *F16C 19/08* (2013.01); *F16C 19/545* (2013.01); *F16C 33/583* (2013.01); *F16C 33/60* (2013.01); *F16C 2352/00* (2013.01)

(58) Field of Classification Search
CPC ........ F16C 19/08; F16C 19/545; F16C 33/60; F16C 2352/00; E21B 4/003; E21B 4/02
USPC ....... 384/420, 453, 456, 490, 504, 507, 513, 384/516, 606, 615; 415/229, 903; 175/107; 173/107
See application file for complete search history.

(56) References Cited

U.S. PATENT DOCUMENTS

| | | | | | |
|---|---|---|---|---|---|
| 2,353,534 | A | * | 7/1944 | Yosh .......................... | E21B 4/02 175/107 |
| 3,018,997 | A | * | 1/1962 | Gros .......................... | E21B 4/02 415/142 |
| 3,754,835 | A | * | 8/1973 | Ivanov ....................... | E21B 4/02 173/107 |

(Continued)

FOREIGN PATENT DOCUMENTS

GB          2083525 A  *  3/1982   ............. E21B 4/003

OTHER PUBLICATIONS

TomaHawk Mud Motor Maintenance Manual, Rev. 2.0, Mar. 18, 2008.

(Continued)

*Primary Examiner* — Marcus Charles
(74) *Attorney, Agent, or Firm* — Jones Walker LLP

(57) ABSTRACT

A bearing section for a mandrel at least partially disposed within an inner bore of a housing. A radial bearing and a thrust bearing are each disposed around the mandrel and within the inner bore of the housing. The radial bearing includes an outer cylindrical member, an inner cylindrical member, and a series of spherical members disposed within a space between an inner surface of the outer cylindrical member and an outer surface of the inner cylindrical member. One of the inner surface of the outer cylindrical member or the outer surface of the inner cylindrical member includes a flat profile and the other includes a series of circumferential grooves. The flat profile allows relative axial movement between the inner and outer cylindrical members without the radial bearing absorbing any thrust load.

26 Claims, 9 Drawing Sheets

(56) References Cited

U.S. PATENT DOCUMENTS

| | | | | |
|---|---|---|---|---|
| 4,493,381 | A | * | 1/1985 | Kajikawa ................ E21B 4/003 175/107 |
| 5,385,407 | A | * | 1/1995 | De Lucia ................ E21B 4/003 175/107 |
| 6,250,806 | B1 | * | 6/2001 | Beshoory ................ E21B 4/003 384/97 |
| 2011/0012455 | A1 | * | 1/2011 | Scott ....................... E21B 4/003 384/606 |
| 2014/0246234 | A1 | * | 9/2014 | Gillis ....................... E21B 7/24 175/24 |

OTHER PUBLICATIONS

International Search Report and Written Opinion dated Dec. 15, 2017 from Applicant's counterpart International Patent Application No. PCT/US2017/59666.

\* cited by examiner

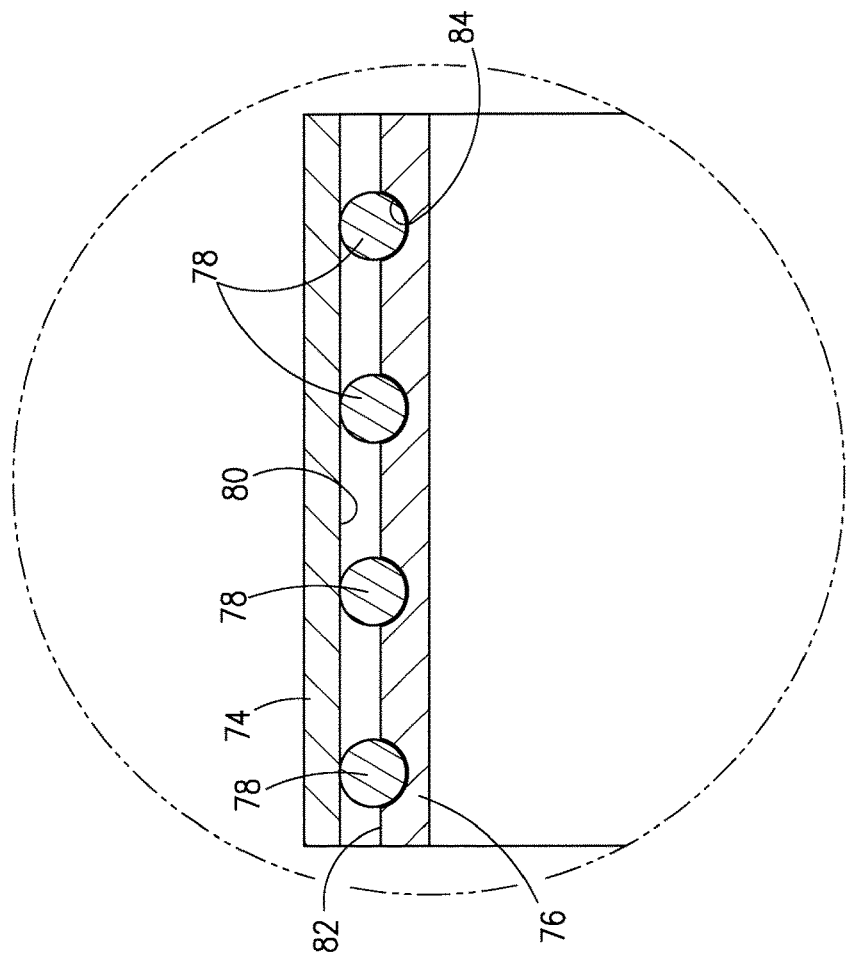
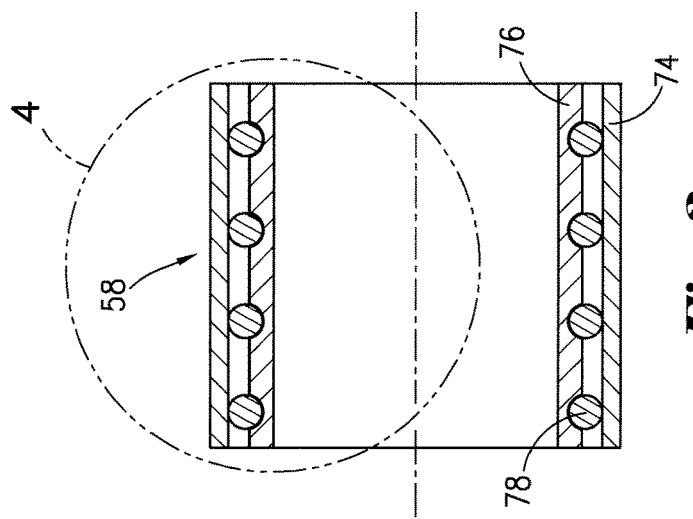

RADIAL BALL BEARING AND METHOD

BACKGROUND OF THE INVENTION

In the drilling of oil and gas wells, downhole drilling motors may be connected to a drill string to rotate and steer a drill bit. Conventional drilling motors typically include a power assembly, a transmission assembly, and a bearing assembly. Rotation is provided by the power assembly. The transmission assembly transmits torque and speed from the power assembly to a drill bit disposed at a lower end of the drilling motor. The bearing assembly takes up the axial and radial loads imparted on the drill string during drilling.

A conventional bearing assembly, such as bearing assembly 10 shown in FIG. 1, includes mandrel 12 positioned through upper radial bearing 14, thrust bearing 16, and lower radial bearing 18. Lower end 20 of mandrel 12 is configured to engage a drill bit. Upper bearing housing 22 encloses upper radial bearing 14 and thrust bearing 16. Lower bearing housing 24 encloses lower radial bearing 18. Upper radial bearing 14 includes outer sliding member 26 and inner sliding member 28. Lower radial bearing 18 includes outer sliding member 30 and inner sliding member 32. Outer sliding members 26 and 30 each includes an inner surface having a flat profile, and inner sliding members 28 and 32 each includes an outer surface having a flat profile. The opposing flat profiles slide along one another as outer and inner sliding members 26, 28 and 30, 32 rotate relative to one another. Thrust bearing 16 includes a series of ball bearings 34 disposed within grooves formed by multiple outer thrust members 36 and multiple inner thrust members 38. Sliding radial bearings wear due to frictional forces that causes abrasive wear at the contact surfaces. The diameters of ball bearings 34 decrease as they are worn, which causes relative axial movement between outer thrust members 36 and inner thrust members 38. This relative axial movement in turn causes relative axial movement between outer sliding member 26 and inner sliding member 28 and relative axial movement between outer sliding member 30 and inner sliding member 32. Because the flat profiles of each sliding member allows the relative axial movement within upper radial bearing 14 and lower radial bearing 18, the radial bearings do not absorb any of the thrust load.

In other conventional bearing assemblies, radial bearings are formed with ball or roller bearings to reduce abrasive wear associated with friction. The inner and outer members of radial ball bearings each includes a groove, and each ball bearing is disposed within a groove of the inner member and a groove of the outer member. As ball bearings of the thrust bearing are worn and their diameters decrease, relative axial movement between the outer thrust members and the inner thrust members applies an uneven load on inner members and outer members of the radial bearing. Because of the radial bearing's arrangement with the ball bearings disposed within grooves in the outer members and the inner members, relative axial movement between the outer members and inner members is not allowed. Accordingly, this radial bearing arrangement fails as the thrust bearing is worn.

BRIEF DESCRIPTION OF THE DRAWINGS

FIG. 3 is a cross-sectional view of the radial ball bearing shown in FIG. 2.

FIG. 4 is a partial cross-sectional view of Detail 4 in FIG. 3.

DETAILED DESCRIPTION OF THE PREFERRED EMBODIMENTS

A bearing section may include a mandrel at least partially disposed within an inner bore of a housing. A radial bearing and a thrust bearing may each be disposed around the mandrel and within the inner bore of the housing. The radial bearing may include an outer cylindrical member, an inner cylindrical member, and a series of spherical members disposed within a space between an inner surface of the outer cylindrical member and an outer surface of the inner cylindrical member. One of the inner surface of the outer cylindrical member or the outer surface of the inner cylindrical member may include a flat profile, while the other includes a series of circumferential grooves. The flat profile allows relative axial movement between the inner and outer cylindrical members without the radial bearing absorbing any thrust load. The outer cylindrical member and the inner cylindrical member may include a single sleeve or a series of rings.

Figure 1:
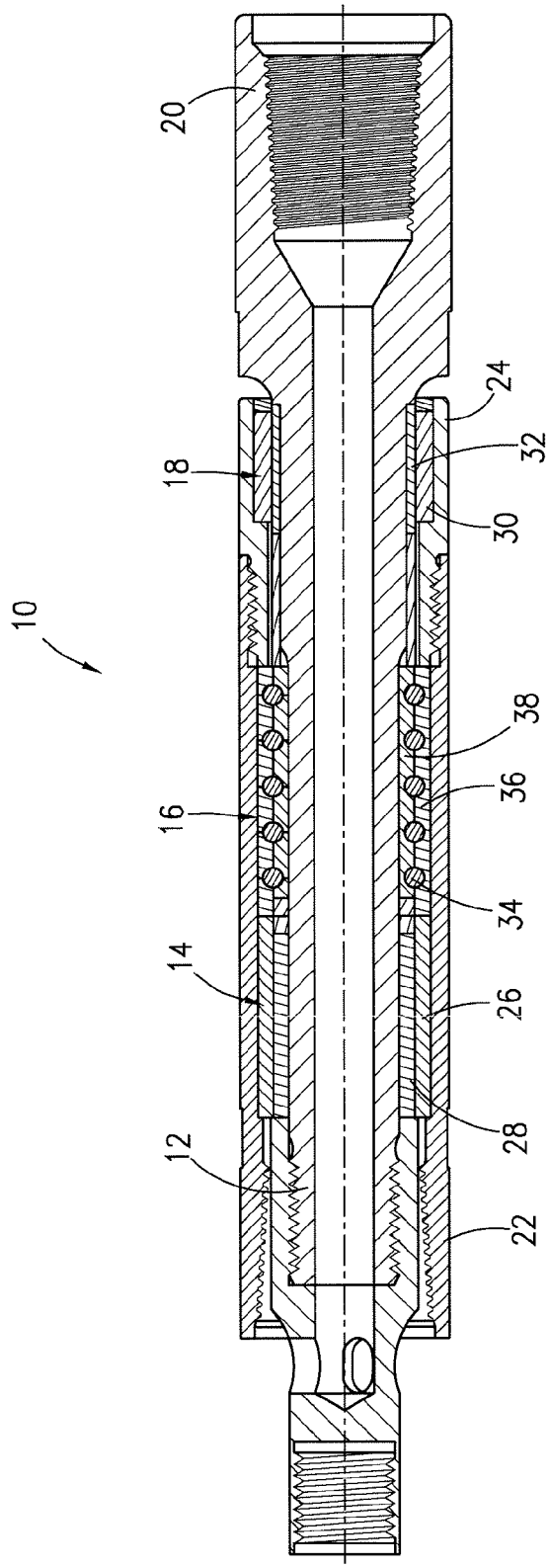
FIG. 1 is a cross-sectional view of a conventional bearing assembly.
Figure 2:
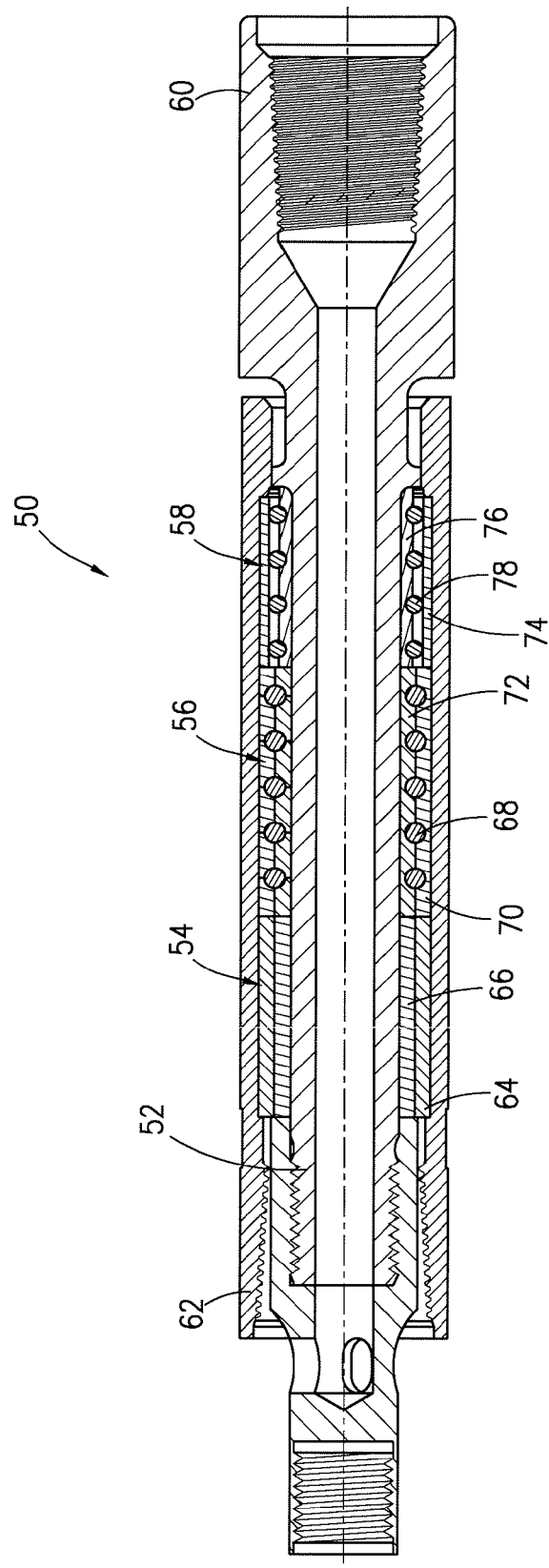
FIG. 2 is a cross-sectional view of a bearing section including a radial ball bearing disclosed herein.

With reference to FIG. 2, bearing assembly 50 may include mandrel 52 positioned through upper radial bearing 54, thrust bearing 56, and lower radial bearing 58. Lower end 60 of bearing assembly 50 may be configured to engage a drill bit. Bearing housing 62 may enclose upper radial bearing 54, thrust bearing 56, and lower radial bearing 58. Upper radial bearing 54 may include outer member 64 and inner member 66 disposed within outer member 64. An inner surface of outer member 64 and an outer surface of inner member 66 may each include a flat profile. The opposing flat profiles may slide along one another as outer and inner members 64 and 66 rotate relative to one another. Thrust bearing 56 may include a series of ball bearings 68 disposed within grooves formed by multiple outer thrust members 70 and multiple inner thrust members 72. Lower radial bearing 58 may be a radial ball bearing arrangement including outer member 74, inner member 76 disposed within outer member 74, and a series of ball bearings 78 between outer member 74 and inner member 76. Outer member 74 and inner member 76 may each be cylindrically shaped.

Referring to FIGS. 3 and 4, inner surface 80 of outer member 74 may include a flat profile. Outer surface 82 of inner member 76 may include a series of circumferential grooves 84. Each of ball bearings 78 may be disposed in one of circumferential grooves 84. As outer and inner members 74 and 76 rotate relative to one another, ball bearings 78 may rotate within circumferential grooves 84 of inner member 76 but may freely travel along flat profile of inner surface 80 of outer member 74. In this way, radial ball bearing 58 allows axial movement between outer and inner members 74 and 76 without radial ball bearing 58 absorbing any thrust load. Radial ball bearing 58 may include any corresponding number (e.g., two to thirty) of ball bearings 78 and circumferential grooves 84.

Figure 6:
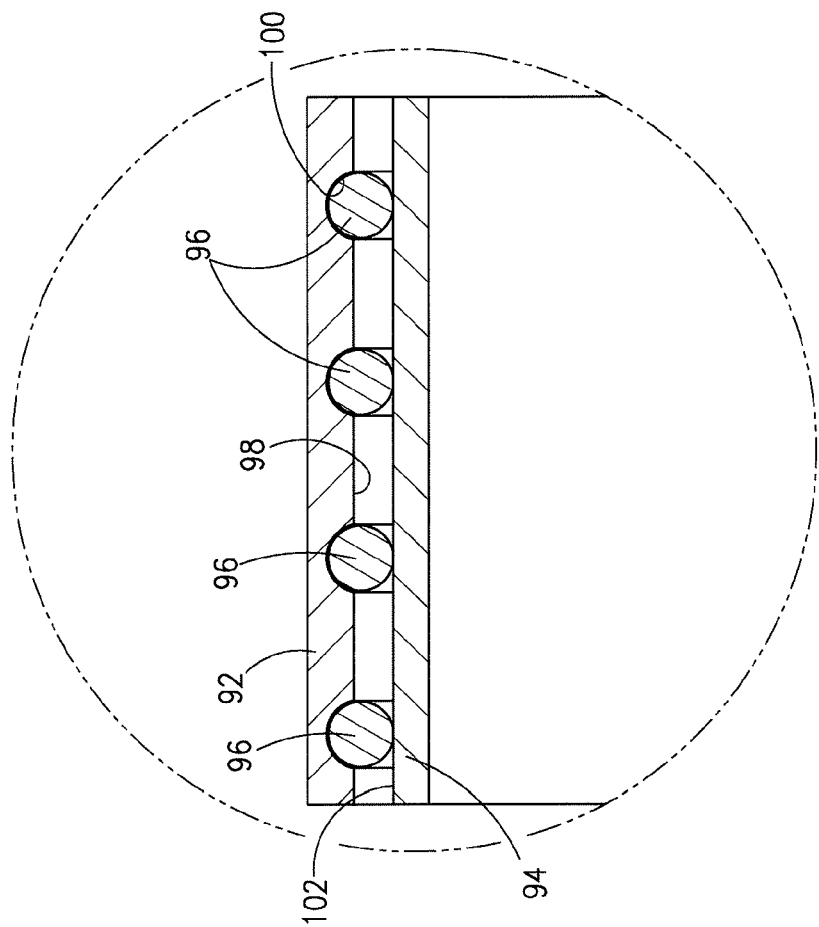
FIG. 6 is a partial cross-sectional view of Detail 6 in FIG. 5.
Figure 5:
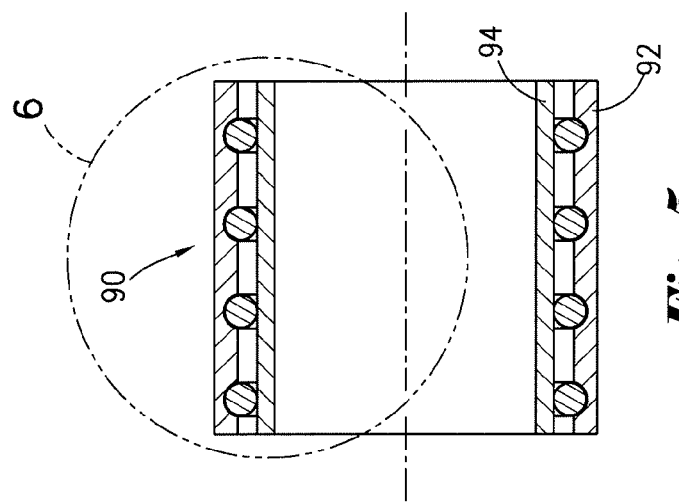
FIG. 5 is a cross-sectional view of an alternate radial ball bearing.

FIGS. 5 and 6 illustrate alternate radial ball bearing 90, which may include outer member 92, inner member 94 disposed within outer member 92, and a series of ball bearings 96. Outer member 92 may include inner surface 98 having a series of circumferential grooves 100. Inner member 94 may include outer surface 102 having a flat profile. Each of ball bearings 96 may be disposed in one of circumferential grooves 100. As outer and inner members 92 and 94 rotate relative to one another, ball bearings 96 may rotate within circumferential grooves 100 of outer member 92 but may freely travel along flat profile of outer surface 102 of inner member 94. In this way, radial ball bearing 90 allows axial movement between outer and inner members 92 and 94 without radial ball bearing 90 absorbing any thrust load. Radial ball bearing 90 may include any corresponding number (e.g., two to thirty) of ball bearings 96 and circumferential grooves 100.

Figure 8:
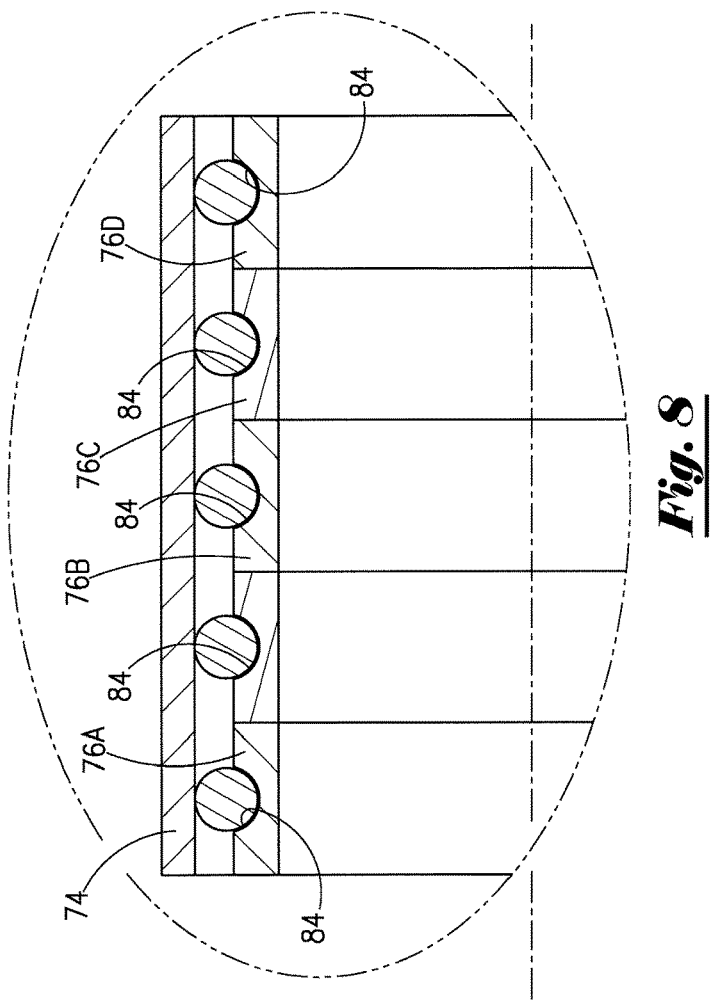
FIG. 8 is a partial cross-sectional view of Detail 8 in FIG. 7.
Figure 7:
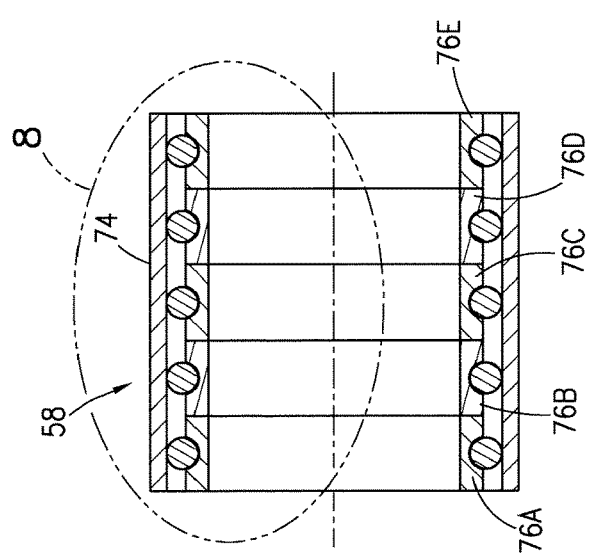
FIG. 7 is a cross-sectional view of another alternate radial ball bearing.

Outer and inner members 74 and 76 of radial ball bearing 58 and outer and inner members 92 and 94 of radial ball bearing 90 may each be formed of a single continuous piece. Alternatively, any of members 74, 76, 92, or 94 may be formed of multiple rings. For example, FIGS. 7 and 8 show radial ball bearing 58 including outer member 74 formed of a single continuous piece and inner member 76 formed of separate rings 76A, 76B, 76C, 76D, and 76E, each including a single circumferential groove 84. In the same way, outer member 92 of radial ball bearing 90 may be formed of separate rings, such as separate rings each including a single circumferential groove 100.

Radial ball bearings 58 or 90 may each be used in a bearing section having any configuration. In other words, radial ball bearing 58 or 90 may each be used as a lower radial bearing, an upper radial bearing, or as both an upper and a lower radial bearing. As shown in FIG. 2, radial ball bearing 58 may be used as a lower radial bearing in bearing section 50, which also includes thrust bearing 56 disposed above radial ball bearing 58 and upper radial bearing 54 disposed above thrust bearing 56. Upper radial bearing 54 may be a conventional sliding radial bearing. In an alternate embodiment, radial ball bearing 90 may be used as the lower radial bearing in bearing section 50.

With reference again to FIG. 2, bearing section 50 may be used in a mud lubricated drilling motor. Drill cuttings in the drilling mud may cause wear on ball bearings 68, thereby reducing the diameter of ball bearings 68. With decreasing diameters of ball bearings 68, outer and inner thrust members 70 and 72 may become unaligned such that outer and inner thrust members 70 and 72 exert unequal axial forces on outer and inner members 74 and 76 of radial ball bearing 58. Because of flat profile of inner surface 80 of outer member 74 (shown in FIGS. 3 and 4), outer and inner members 74 and 76 of radial ball bearing 58 may move axially relative to one another in response to the unequal axial forces. The relative axial movement between outer and inner members 74 and 76 of radial ball bearing 58 prevents ball bearings 78 from absorbing any axial load, leading to less failure of ball bearings 78 even with wear on ball bearings 68 of thrust bearing 56.

Figure 9:
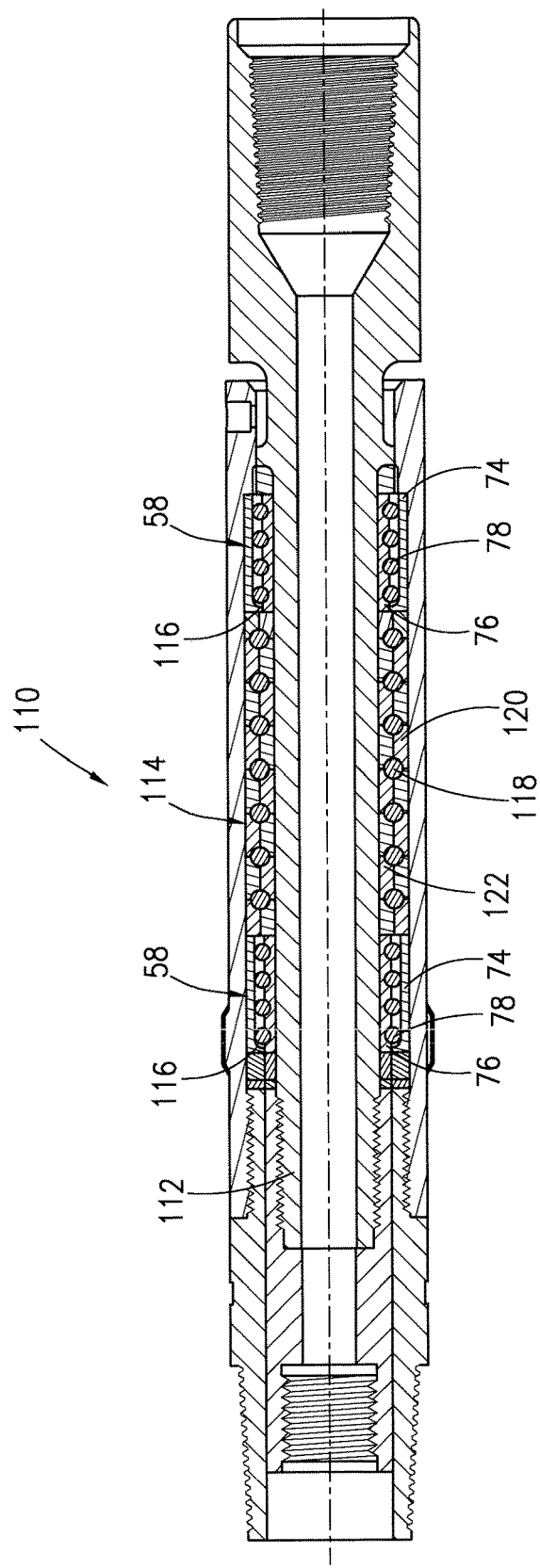
FIG. 9 is a cross-sectional view of an alternate bearing section including an upper radial ball bearing and a lower radial ball bearing.

FIG. 9 illustrates alternate bearing section 110 including mandrel 112 positioned through upper radial ball bearing 58, thrust bearing 114, and lower radial ball bearing 58. Each of upper and lower radial ball bearings 58 may include outer member 74, inner member 76 disposed within outer member 74, and a series of ball bearings 78 between outer and inner members 74 and 76. In one embodiment, outer members 74 may each include upper shoulder 116. Thrust bearing 114 may include a series of ball bearings 118 disposed within grooves formed by multiple outer thrust members 120 and multiple inner thrust members 122. As ball bearings 118 of thrust bearing 114 wear and outer and inner thrust members 120 and 122 exert unequal axial forces on outer and inner members 74 and 76 of upper and lower radial ball bearings 58, outer and inner members 74 and 76 may move axially relative to one another to prevent failure of ball bearings 78. Upper shoulders 116 of outer members 74 may prevent relative axial movement of outer and inner members 74 and 76 beyond upper shoulders 116.

Figure 10:
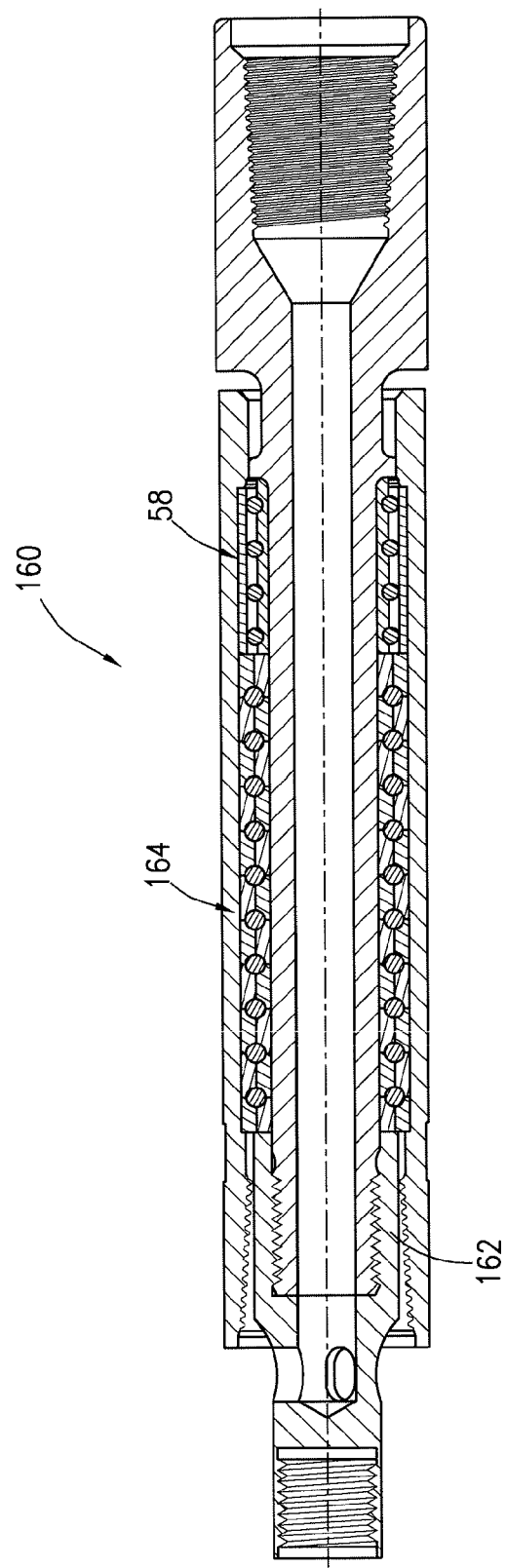
FIG. 10 is a cross-sectional view of an alternate bearing section including a lower radial ball bearing.

FIG. 10 illustrates alternate bearing section 160 including mandrel 162 positioned through thrust bearing 164 and lower radial ball bearing 58. Thrust bearing 164 may be designed similar to thrust bearings 56, 114, and 134. Bearing section 160 may include no upper radial bearing. Alternatively, thrust bearing 164 may also function as an upper radial bearing.

Figure 11:
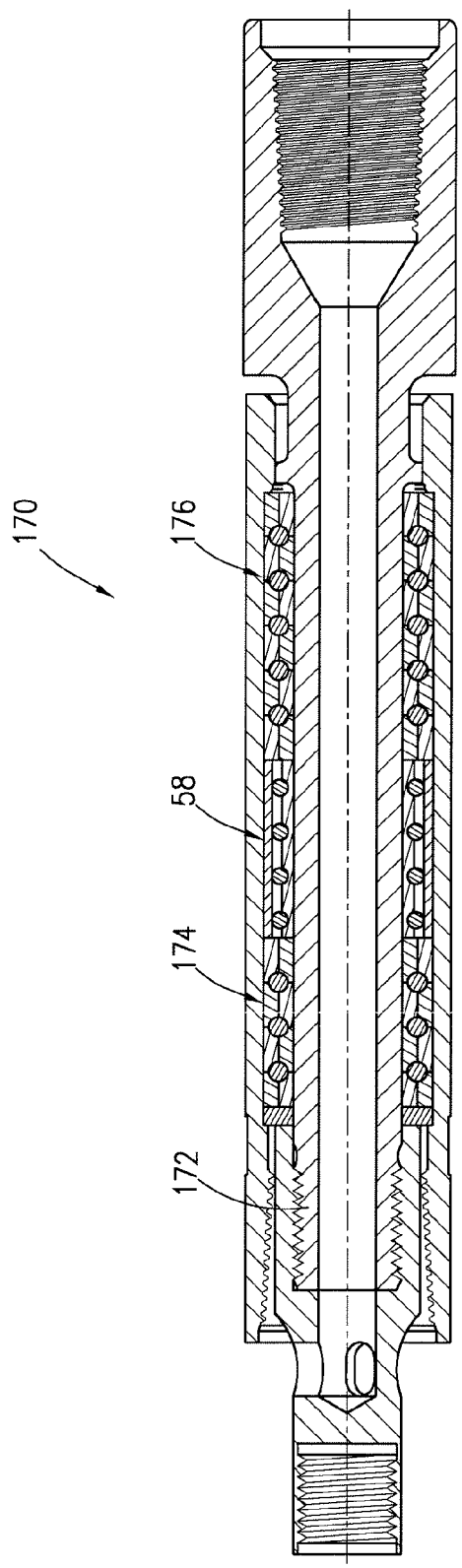
FIG. 11 is a cross-sectional view of an alternate bearing section including a radial ball bearing positioned between an upper thrust bearing and a lower thrust bearing.

FIG. 11 illustrates alternate bearing section 170 including mandrel 172 positioned through upper thrust bearing 174, upper radial ball bearing 58, and lower thrust bearing 176. Upper and lower thrust bearings 174 and 176 may each be designed similar to thrust bearings 56, 114, and 134.

Figure 12:
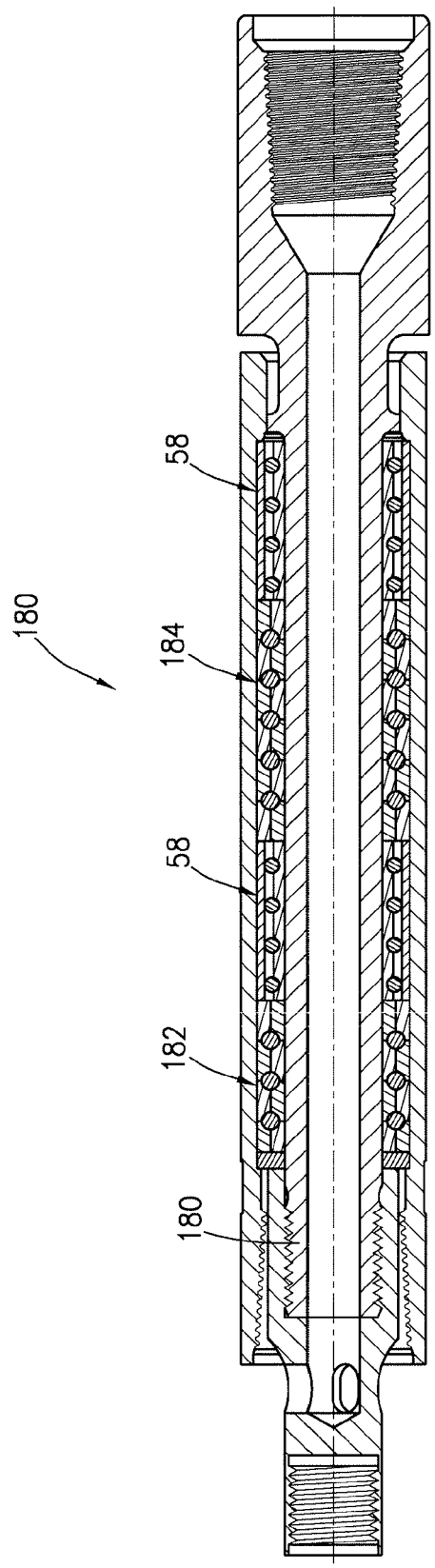
FIG. 12 is a cross-sectional view of an alternate bearing section including an upper radial ball bearing disposed between an upper thrust bearing and a lower thrust bearing, and a lower radial ball bearing disposed below the lower thrust bearing.

FIG. 12 illustrates alternate bearing section 180 including mandrel 182 positioned through upper thrust bearing 184, upper radial ball bearing 58, lower thrust bearing 186, and lower radial ball bearing 58. Upper and lower thrust bearings 184 and 186 may each be designed similar to thrust bearings 56, 114, and 134.

As the ball bearings of thrust bearings 164, 174, 176, 182, and 184 wear and the outer and inner thrust members of these thrust bearings exert unequal forces on outer and inner members 74 and 76 of radial ball bearings 58, outer and inner members 74 and 76 may move axially relative to one another to prevent failure of ball bearings 78.

While preferred embodiments have been described, it is to be understood that the embodiments are illustrative only and that the scope of the invention is to be defined solely by the appended claims when accorded a full range of equivalents, many variations and modifications naturally occurring to those skilled in the art from a review hereof.

The invention claimed is:

1. A bearing section for a mud lubricated drilling motor, comprising:
   a housing having an inner bore;
   a mandrel at least partially disposed within the inner bore of the housing;
   a thrust bearing disposed around the mandrel and within the inner bore of the housing;
   a first radial bearing disposed around the mandrel and within the inner bore of the housing, the first radial bearing positioned below the thrust bearing, the first radial bearing including:
      a first outer cylindrical member including a first inner surface;

a first inner cylindrical member including a first outer surface, wherein the first inner cylindrical member is disposed within the first outer cylindrical member, wherein one of the first inner surface of the first outer cylindrical member or the first outer surface of the first inner cylindrical member includes a first flat profile and the other includes a first series of circumferential grooves;

a first series of spherical members disposed within a space between the first inner surface of the first outer cylindrical member and the first outer surface of the first inner cylindrical member, wherein each spherical member of the first series of spherical members engages one of the circumferential grooves of the first series of circumferential grooves;

a second radial bearing disposed around the mandrel and within the inner bore of the housing, the second radial bearing positioned above the thrust bearing, the second radial bearing including:

a second outer cylindrical member including a second inner surface;

a second inner cylindrical member including a second outer surface, wherein the second inner cylindrical member is disposed within the second outer cylindrical member, wherein one of the second inner surface of the second outer cylindrical member or the second outer surface of the second inner cylindrical member includes a second flat profile and the other includes a second series of circumferential grooves; and a second series of spherical members disposed within a space between the second inner surface of the second outer cylindrical member and the second outer surface of the second inner cylindrical member, wherein each spherical member of the second series of spherical members engages one of the circumferential grooves of the second series of circumferential grooves.

2. The bearing section of claim 1, wherein the first outer surface of the first inner cylindrical member includes the first flat profile and wherein the first flat profile is configured to allow relative axial movement between the first inner cylindrical member and the first outer cylindrical member without the first radial bearing absorbing any thrust load.

3. The bearing section of claim 2, wherein the first outer surface of the first inner cylindrical member includes a first upper shoulder configured to limit the relative axial movement between the first outer cylindrical member and the first inner cylindrical member.

4. The bearing section of claim 2, wherein the first inner cylindrical member and the first outer cylindrical member are each formed of a first single sleeve.

5. The bearing section of claim 2, wherein the first inner cylindrical member is formed of a first series of rings, and wherein the first outer cylindrical member is formed of a first single sleeve.

6. The bearing section of claim 2, wherein the first inner cylindrical member is formed of a first single sleeve, and wherein the first outer cylindrical member is formed of a first series of rings.

7. The bearing section of claim 2, wherein the first inner cylindrical member and the first outer cylindrical member are each formed of a first series of rings.

8. The bearing section of claim 1, wherein the first inner surface of the first outer cylindrical member includes the first flat profile and wherein the first flat profile is configured to allow relative axial movement between the first inner cylindrical member and the first outer cylindrical member without the first radial bearing absorbing any thrust load.

9. The bearing section of claim 8, wherein the first inner surface of the first outer cylindrical member includes a first upper shoulder configured to limit the relative axial movement between the first outer cylindrical member and the first inner cylindrical member.

10. The bearing section of claim 8, wherein the first inner cylindrical member and the first outer cylindrical member are each formed of a first single sleeve.

11. The bearing section of claim 8, wherein the first inner cylindrical member is formed of a first series of rings, and wherein the first outer cylindrical member is formed of a first single sleeve.

12. The bearing section of claim 8, wherein the first inner cylindrical member is formed of a first single sleeve, and wherein the first outer cylindrical member is formed of a first series of rings.

13. The bearing section of claim 8, wherein the first inner cylindrical member and the first outer cylindrical member are each formed of a first series of rings.

14. The bearing section of claim 1, wherein the second outer surface of the second inner cylindrical member includes the second flat profile and wherein the second flat profile is configured to allow relative axial movement between the second inner cylindrical member and the second outer cylindrical member without the second radial bearing absorbing any thrust load.

15. The bearing section of claim 14, wherein the second outer surface of the second inner cylindrical member includes a second upper shoulder configured to limit the relative axial movement between the second outer cylindrical member and the second inner cylindrical member.

16. The bearing section of claim 14, wherein the second inner cylindrical member and the second outer cylindrical member are each formed of a second single sleeve.

17. The bearing section of claim 14, wherein the second inner cylindrical member is formed of a second series of rings, and wherein the second outer cylindrical member is formed of a second single sleeve.

18. The bearing section of claim 14, wherein the second inner cylindrical member is formed of a second single sleeve, and wherein the second outer cylindrical member is formed of a second series of rings.

19. The bearing section of claim 14, wherein the second inner cylindrical member and the second outer cylindrical member are each formed of a second series of rings.

20. The bearing section of claim 1, wherein the second inner surface of the second outer cylindrical member includes the second flat profile and wherein the second flat profile is configured to allow relative axial movement between the second inner cylindrical member and the second outer cylindrical member without the second radial bearing absorbing any thrust load.

21. The bearing section of claim 20, wherein the second inner surface of the second outer cylindrical member includes a second upper shoulder configured to limit the relative axial movement between the second outer cylindrical member and the second inner cylindrical member.

22. The bearing section of claim 20, wherein the second inner cylindrical member and the second outer cylindrical member are each formed of a second single sleeve.

23. The bearing section of claim 20, wherein the second inner cylindrical member is formed of a second series of rings, and wherein the second outer cylindrical member is formed of a second single sleeve.

24. The bearing section of claim 20, wherein the second inner cylindrical member is formed of a second single sleeve, and wherein the second outer cylindrical member is formed of a second series of rings.

25. The bearing section of claim 20, wherein the second inner cylindrical member and the second outer cylindrical member are each formed of a second series of rings.

26. A method of absorbing a radial load in a mud lubricated drilling motor, comprising the steps of:
a) providing a bearing section for the drilling motor comprising: a housing having an inner bore; a mandrel at least partially disposed within the inner bore of the housing; a thrust bearing disposed around the mandrel and within the inner bore of the housing; a first radial bearing disposed around the mandrel and within the inner bore of the housing, the first radial bearing positioned below the thrust bearing, the first radial bearing including: a first outer cylindrical member having a first inner surface; a first inner cylindrical member including a first outer surface, wherein the first inner cylindrical member is disposed within the first outer cylindrical member, wherein one of the first inner surface of the first outer cylindrical member or the first outer surface of the first inner cylindrical member includes a first flat profile and the other includes a first series of circumferential grooves; a first series of spherical members disposed within a space between the first inner surface of the first outer cylindrical member and the first outer surface of the first inner cylindrical member, wherein each spherical member of the first series of spherical members engages one of the circumferential grooves of the first series of circumferential grooves; a second radial bearing disposed around the mandrel and within the inner bore of the housing, the second radial bearing positioned above the thrust bearing, the second radial bearing including: a second outer cylindrical member including a second inner surface; a second inner cylindrical member including a second outer surface, wherein the second inner cylindrical member is disposed within the second outer cylindrical member, wherein one of the second inner surface of the second outer cylindrical member or the second outer surface of the second inner cylindrical member includes a second flat profile and the other includes a second series of circumferential grooves; and a second series of spherical members disposed within a space between the second inner surface of the second outer cylindrical member and the second outer surface of the second inner cylindrical member, wherein each spherical member of the second series of spherical members engages one of the circumferential grooves of the second series of circumferential grooves;
b) rotating the first inner cylindrical member of the first radial bearing relative to the first outer cylindrical member and the second inner cylindrical member of the second radial bearing relative to the second outer cylindrical member;
c) absorbing a radial load with the first and second radial bearings and absorbing a thrust load with the thrust bearing; and
d) allowing relative axial movement between the first outer cylindrical member and the first inner cylindrical member of the first radial bearing without causing the first radial bearing to fail and relative axial movement between the second outer cylindrical member and the second inner cylindrical member of the second radial bearing without causing the second radial bearing to fail.

* * * * *